United States Patent
Lee et al.

(10) Patent No.: US 6,860,223 B2
(45) Date of Patent: Mar. 1, 2005

(54) SELF-PROPELLED PERSONAL WATERCRAFT

(75) Inventors: Anthony E. Lee, Easley, SC (US); Marc P. Lyle, Chattanooga, TN (US); David E. Maughan, Easley, SC (US); Mark R. Robertson, Greenville, SC (US); Scott D. Henderson, Pickens, SC (US)

(73) Assignee: WaterMark Paddlesports, Inc., Easley, SC (US)

( * ) Notice: Subject to any disclaimer, the term of this patent is extended or adjusted under 35 U.S.C. 154(b) by 0 days.

(21) Appl. No.: 10/633,330

(22) Filed: Jul. 31, 2003

(65) Prior Publication Data

US 2005/0022717 A1 Feb. 3, 2005

(51) Int. Cl.[7] ............................................... B63B 17/00
(52) U.S. Cl. ...................................... 114/364; 114/347
(58) Field of Search ............................... 114/347, 364, 114/352, 355, 363; 441/129

(56) References Cited

U.S. PATENT DOCUMENTS

| | | | |
|---|---|---|---|
| 1,041,679 A | * 10/1912 | Sargent | 114/347 |
| 1,449,222 A | 3/1923 | Goethel | 114/352 |
| 2,666,933 A | 1/1954 | Engensperger | 114/352 |
| 2,999,253 A | 9/1961 | Lewis | 114/347 |
| 3,129,443 A | 4/1964 | Maturi et al. | 114/352 |
| 3,822,427 A | 7/1974 | Ewart, Jr. | 114/352 |
| 3,916,468 A | 11/1975 | Tetreault et al. | 114/352 |
| 3,965,513 A | 6/1976 | Horiuchi | 114/352 |
| 4,138,753 A | * 2/1979 | Wood | 441/129 |
| 4,503,799 A | * 3/1985 | Masters | 114/363 |
| 4,715,311 A | 12/1987 | Masters | 114/347 |
| 4,727,821 A | 3/1988 | Masters | 114/347 |

OTHER PUBLICATIONS

Wave Sport Kayaks internet pages, www.wavesport.com, Wave Sports, Inc., pp. 1–3, printed Nov. 30, 2003.

* cited by examiner

Primary Examiner—Lars A. Olson
(74) Attorney, Agent, or Firm—Kolisch Hartwell, P.C.

(57) ABSTRACT

A self-propelled personal watercraft is disclosed, wherein the personal watercraft includes a body including a hull and a deck substantially covering the hull, wherein the body includes a bow portion and a stern portion. The personal watercraft also includes a deck modification module removably attached to the deck, wherein the deck modification module is configured to be selectively removable to change a performance characteristic of the deck when the deck is submerged in water.

39 Claims, 2 Drawing Sheets

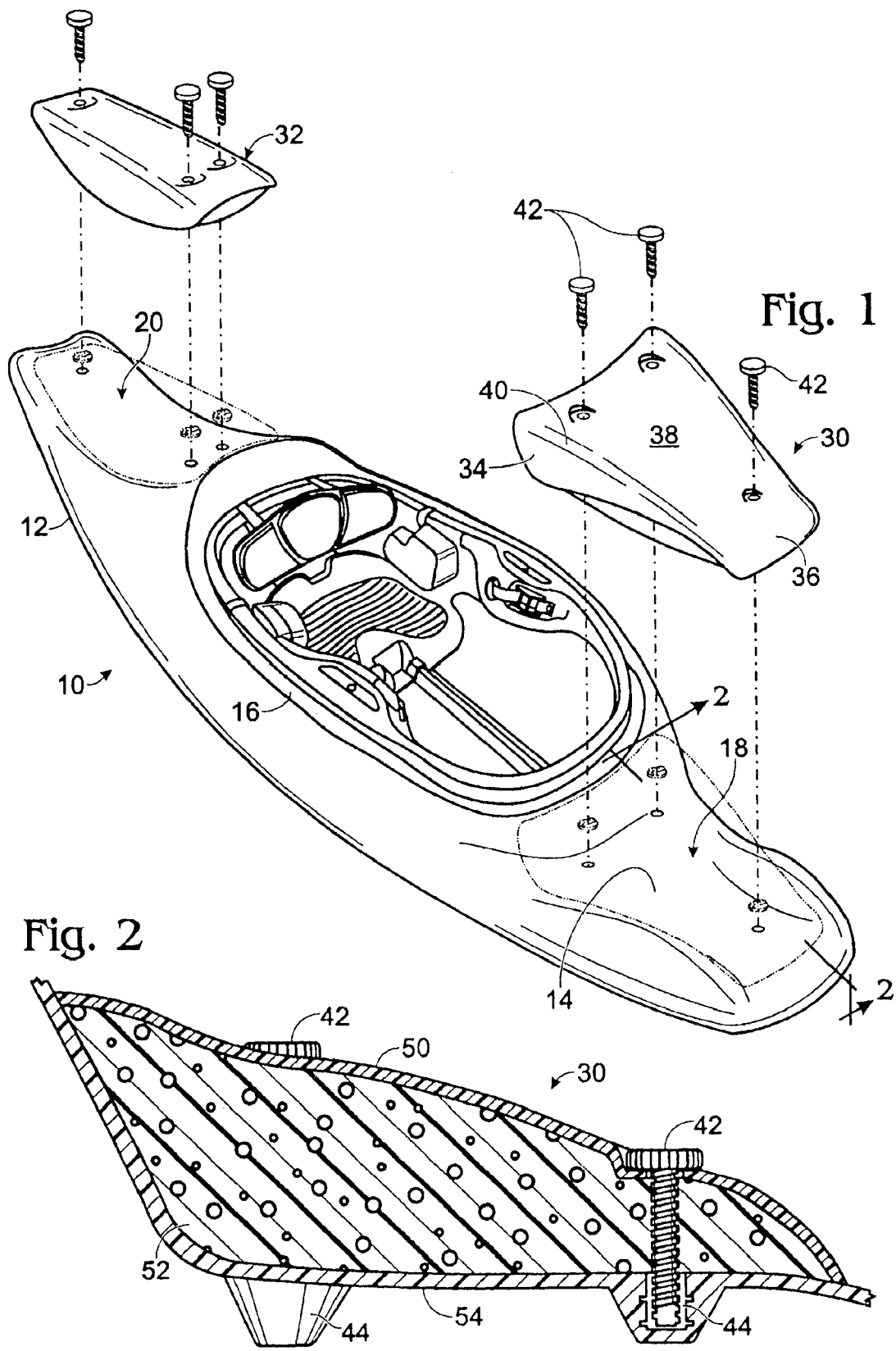

SELF-PROPELLED PERSONAL WATERCRAFT

BACKGROUND

Personal self-propelled watercraft intended for different types of uses typically have very different designs, even where the uses may be closely related. For example, freestyle whitewater boating, which involves using waves, hydraulics and other river and/or ocean features to perform tricks, has become so specialized that different boat designs exist for performing different kinds of tricks. For example, boats with longer, flatter ends are typically used for performing vertical, in-the-water tricks such as cartwheels, while boats with shorter, blunter ends are typically used for performing aerial tricks, such as flips (or "loops").

One consequence of such design specialization is that a freestyle boater may need to purchase multiple boats to be able to perform different types of tricks optimally. Furthermore, where a boater desires to perform both aerial and in-the-water tricks on a single boating trip, the boater may need to bring more than one boat along on the trip. Because the boater can ordinarily paddle only one boat at a time, a boater wanting to perform both types of tricks may be restricted to boating at locations where boats can be easily exchanged, such as at roadside river features.

SUMMARY

One embodiment provides a self-propelled personal watercraft, wherein the personal watercraft includes a body including a hull and a deck substantially covering the hull, wherein the body includes a bow portion and a stern portion. The personal watercraft also includes a deck modification module removably attached to the deck, wherein the deck modification module is configured to be selectively removable to change a performance characteristic of the deck when the deck is submerged in water.

Another embodiment provides a self-propelled personal watercraft, including a body having a hull and a deck at least partially covering the hull, and a buoyant deck modification module removably coupled to the deck, wherein the deck modification module is removable to decrease a volume of water displaced by the deck when the deck is submerged in water.

Another embodiment provides a buoyant module for attaching to a deck of a decked self-propelled personal watercraft, the buoyant module including a first surface configured to rest at least partially against the deck of the personal watercraft and a second surface configured to interact with a flow of water across the deck of the personal watercraft. The first surface is spaced from the second surface and is contoured to match a shape of the deck, and a buoyant material is disposed between the first surface and second surface.

BRIEF DESCRIPTION OF THE DRAWINGS

FIG. 1 is a partially exploded view of a first embodiment of a self-propelled personal watercraft according to the present invention.

FIG. 2 is a sectional view of a bow deck modification module of the embodiment of FIG. 1.

DETAILED DESCRIPTION OF THE DEPICTED EMBODIMENTS

Figure 3:
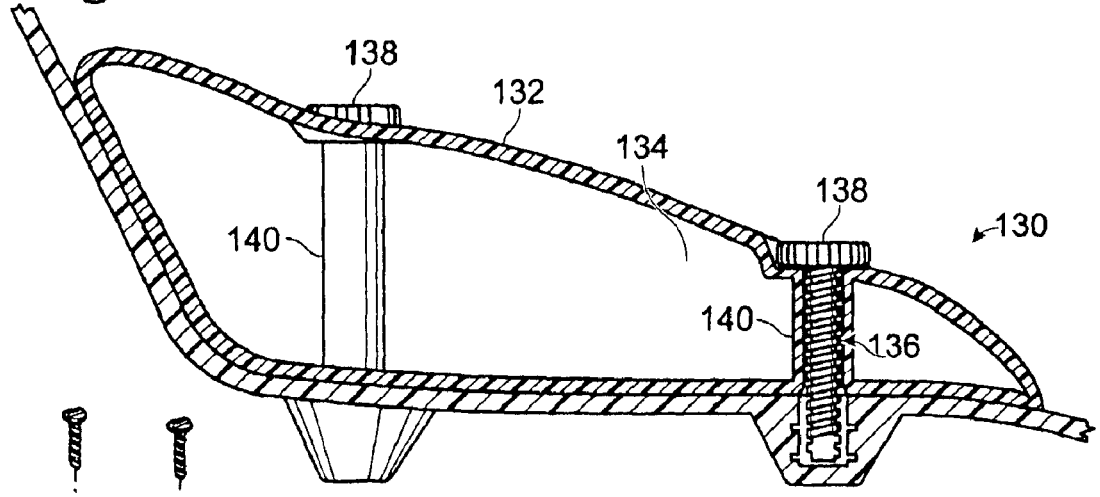
FIG. 3 is a sectional view of an alternate construction of the bow deck modification module of the embodiment of FIG. 1.

FIG. 1 shows, generally at 10, a first embodiment of a self-propelled personal watercraft according to the present invention, in the form of a whitewater kayak. Kayak 10 includes a hull 12, and a deck 14 substantially covering the bull to form an enclosed body. Deck 14 includes a cockpit 16 configured to accommodate a user. Cockpit 16 is positioned between a bow region 18 and a stern region 20 of kayak 10. Kayak 10 also includes a bow deck modification module 30 removably mounted to the bow of kayak 10, and a stern deck modification module 32 removably mounted to the stern of kayak 10. While the depicted embodiment is a whitewater kayak, it will be appreciated that a self-propelled personal watercraft according to the present invention may take any other suitable form, including but not limited to, decked canoes and open canoes with partial decking.

Deck modification modules 30 and 32 allow the shape, volume, and/or buoyancy of bow 18 and stern 20 of kayak 10 to be selectively modified simply by attaching or removing the deck modification modules. As described above, conventional freestyle kayaks often are configured to perform only one type of trick optimally. For example, some kayaks have short, stubby, buoyant shapes to increase the ease in which the kayak ends can be lifted from the water to perform the aerial tricks. However, such designs may not be optimal for performing in-the-water tricks such as cartwheels, as the buoyant ends may push the kayak out of the water whenever the kayak reaches a vertical position, making it difficult to smoothly transition from bow end to stern end during the cartwheel.

Likewise, other kayaks have thinner, flatter ends configured to slice through the water and stabilize the kayak during vertical, in-the-water tricks such as cartwheels. However, such kayaks may be difficult to lift out of the water for aerial tricks. Yet other kayaks may have a design midway between these specialized designs. However, these kayaks may perform only somewhat marginally for either type of tricks, and optimally for neither type.

Deck modification modules 30 and 32 allow hull 12 and deck 14 of kayak 10 to be designed for some types of tricks in the absence of the deck modification modules, and to be designed for other types of tricks when the deck modification modules are attached. Referring to FIG. 1, bow 18 of kayak 10 may have a somewhat thin, flat shape in the absence of bow deck modification module 30 to slice through the water and not push the kayak too far out of the water for in-the-water tricks such as cartwheels. Stern 20 may have a similar profile in the absence of stern deck modification module 32, thus allowing the boat to transition smoothly between bow and stern ends during such tricks.

Deck modification modules 30 and 32 may be configured to provide sufficient buoyancy to help lift the kayak out of the water for aerial tricks. Thus, bow deck modification module 30 and stern deck modification module 32 may be attached to deck 14 to enable kayak 10 to perform aerial tricks more optimally. Deck modification modules 30 and 32 also may include features configured to interact with water flowing over deck 14 to provide the kayak with additional lift.

Deck modification modules 30 and 32 may have any suitable shape. For example, deck modification modules may have a shape configured for maximum buoyancy and lift from the water, or may have a shape configured to permit some in-the-water tricks to be performed. The shape characteristics of deck modification modules 30 and 32 are described below in the context of bow deck modification module 30, but it will be appreciated that the discussion also applies to stern deck modification module 32.

The depicted deck modification modules 30 and 32 have a configuration that increases the buoyancy of bow 18 and stern 20, yet may allow some in-the-water tricks to be performed. For example, bow deck modification module 30 includes tapered sides 34 and front 36 that slope from a top surface 38 of the module to meet deck 14. Tapered sides 34, front 36 and top surface 38 are configured to allow water to flow smoothly across the bow of kayak 10 when bow deck modification 30 module is mounted to bow 18 (or, equivalently, to allow the bow to move smoothly through the water when submerged). The additional buoyancy provided by bow deck modification module 30 helps achieve additional lift for aerial tricks, while the smooth sides may not impede motion of the bow through the water during in-the-water tricks. If desired, sides 36 may meet top surface 38 at curved corners 40 to help further smooth a flow of water across or over bow deck modification module 30. Alternatively, deck modification modules 30 and 32 may have steeper sides and/or a more angular shape, as described in more detail below in the context of other embodiments.

Deck modification modules 30 and 32 may be coupled to deck 14 of kayak 10 in any suitable manner. In the depicted embodiment, deck modification modules 30 and 32 are coupled to deck 14 via a plurality of bolts 42. Referring to FIG. 2, bolts 42 extend through the entire thickness of deck modification modules 30 and 32, and connect to threaded anchors that are molded into, or otherwise coupled to, deck 14. Bolts 42 may include knurled or T-shaped knobs to facilitate attachment of bolts 42 to deck 14 without tools. Alternatively, deck 14 may include features molded into the deck (not shown) that at least partially hold deck modification modules 30 and 32 in place on the deck. Examples of such features include, but are not limited to, one or more tongues molded into deck 14 that are configured to engage one or more openings or grooves on deck modification modules 30 and 32, or one or more tongues molded into the modules that are configured to engage an opening or groove on the deck.

Deck modification modules 30 and 32 may have any suitable construction. FIG. 2 shows one example of a suitable construction for deck modification modules 30 and 32, in the context of bow deck modification module 30. Bow deck modification module 30 includes an outer layer 50 enclosing a buoyant material 52. The depicted outer layer 50 does not cover a lower surface 54 of bow deck modification module 30, but instead covers only those surfaces subject to a direct flow of water. However, it will be appreciated that outer layer 50 may also cover the entire surface, including lower surface 54, of module 30.

Lower surface 54 is typically configured to have a shape complementary to the contour of deck 14 so that bow deck modification module 30 fits the deck closely. FIG. 2 shows the surface of deck 14 in contact with bow deck modification module to be relatively flat and featureless. However, it will be appreciated that deck 14 may have various features, such as grab loops, metal bars for attaching ropes or locks to kayak 10, and/or surface features molded into deck 14 that are configured to enhance the performance characteristics of deck 14 in the water. Where these features are included on deck 14, lower surface 54 may include contours configured to accommodate these features.

Outer layer 50 may be constructed of any suitable material. Suitable materials include materials that are sufficiently rigid to resist significant deformation caused by forces exerted by water during ordinary use of kayak 10, and/or materials that are water resistant. Examples of suitable materials include, but are not limited to, polyethylene, ABS plastic, and polymer/fiber composite materials, such as TWINTEX polypropylene and TWINTEX polyester, manufactured by Vetrotex America of Wichita Falls, Tex.

Similarly, outer layer 50 may be constructed in any suitable manner. For example, outer layer 50 may be constructed via a thermoform molding process. Alternatively, outer layer 50 may be constructed via another molding technique. Examples include, but are not limited to, injection molding, blow molding, and rotational molding.

Buoyant material 52 is configured to have a lower density than water so that bow deck modification module 30 helps to push kayak 10 out of the water when the bow of deck 14 is submerged in water. Where outer layer 50 does not cover lower surface 54 of bow deck modification module 30, buoyant material 52 also helps to displace water when the module is submerged. Buoyant material 52 may be formed from any suitable material or materials with a lower density than water. Examples of suitable materials include many closed-cell foams, as these materials tend not to absorb water. Example of suitable closed-cell foams include, but are not limited to, cross-linked polyethylene foams.

Buoyant material 52 may be bonded or otherwise coupled to outer layer 50 to prevent buoyant material 52 and outer layer 50 from becoming separated while module 30 is removed from deck 14. Buoyant material 52 may be bonded to outer layer 50 in any suitable manner, including but not limited to, adhesives and mechanical means such as fasteners, clamps, tongue-and-slot connectors, etc.

FIG. 3 shows, generally at 130, an alternative construction of the bow deck modification module. Bow deck modification module 130 has a similar shape to bow deck modification module 30, but includes an outer layer 132 that completely surrounds the module. Thus, outer layer 132 completely encloses a buoyant material 134. Outer layer 132 may be formed as a single piece, for example by rotational or injection molding. Alternatively, outer layer 132 may be formed from a plurality of shaped pieces that are joined together.

Bow deck modification module 130 may include one or more channels 136 formed through the module to accommodate bolts 138 (or other fasteners) for attaching the module to deck 14. Channels 136 may be completely enclosed to avoid introducing openings into the interior of deck modification module 130. This may help to prevent water from getting inside of deck modification module 130.

Channels 136 are bordered by walls 140. Walls 140 may be formed during the same molding process used to form bow deck modification module 130, or may be formed in a separate process. For example, walls 140 may be formed by first forming a hole through module 130, then inserting open-ended tubes through the hole to form wall 140, and then connecting the edges of the open ends of the tubes to the edges of the hole to form channel 136.

Any suitable material with a density less than that of water may be used as buoyant material 134. Because outer layer 132 of bow deck modification module 130 completely encloses buoyant material 134, a wide variety of materials may be used. For example, a gas, such as air, may be used as buoyant material 134. Alternatively, other materials, such as an open or closed cell foam, may be used as buoyant material 134.

Figure 4:
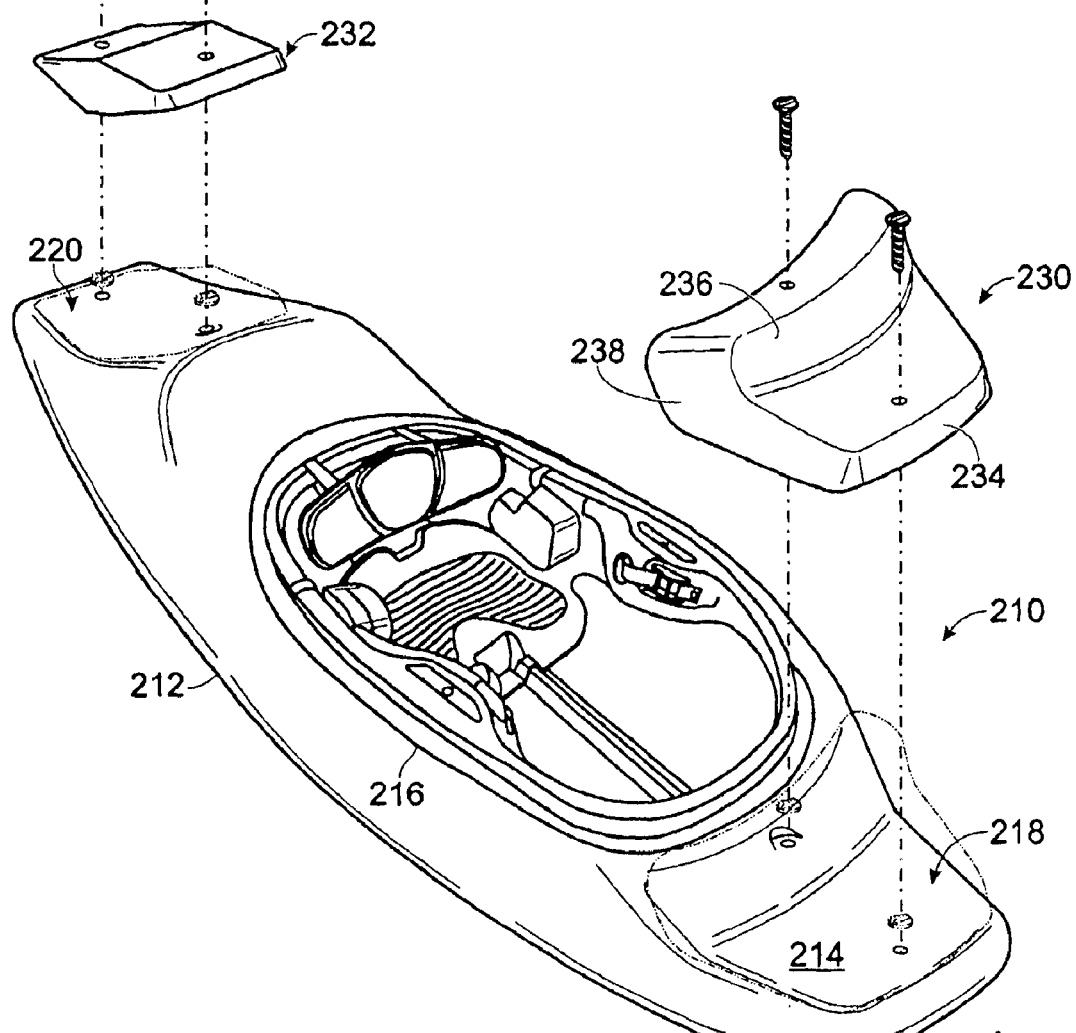
FIG. 4 is a partially exploded view of a second embodiment of a self-propelled personal watercraft according to the present invention.

FIG. 4 shows, generally at 210, a second embodiment of a self-propelled personal watercraft according to the present invention, also in the form of a whitewater kayak. Like kayak 10, kayak 210 includes a hull 212, and a deck 214 substantially covering the hull to form an enclosed body. Deck 214 includes a cockpit 216 configured to accommodate a user. Cockpit 216 is positioned between a bow region 218 and a stern region 220 of kayak 210. Kayak 210 also includes a bow deck modification module 230 removably mounted to the bow of kayak 10, and a stern deck modification module 232 removably mounted to the stern of kayak 210. The design and performance features of the depicted modification modules 230 and 232 are described below in the context of bow deck modification module 230, but it will be appreciated that the discussion also applies to stern deck modification module 232.

Bow deck modification module 230 includes a less-tapered front edge 234 than modification module 30, and also includes an upturned surface 236 positioned on an end of the bow deck modification module adjacent cockpit 216. Upturned surface 236 and front edge 234 are each configured to "catch" a flow of water across the bow of watercraft 210 such that the flow of water against upturned surface 236 and front edge 234 helps to push the bow under water for the initiation of an aerial trick.

Bow deck modification module 230 also includes less-tapered side edges 238 than bow deck modification module 30. This may allow bow deck modification module 230 to have a greater volume, and thus greater buoyancy, than a bow deck modification module of a similar size but with more tapered sides, and thus may facilitate the performance of aerial tricks.

Although the present disclosure includes specific embodiments, specific embodiments are not to be considered in a limiting sense, because numerous variations are possible. The subject matter of the present disclosure includes all novel and nonobvious combinations and sub-combinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A self-propelled personal watercraft, comprising:
a body including a hull and a deck substantially covering the hull, wherein the body includes a bow portion and a stern portion; and
a deck modification module removably attached to the deck, wherein the deck modification module is configured to be positioned substantially wholly over the deck and to be selectively removable to change a performance characteristic of the deck when the deck is submerged in water.

2. The personal watercraft of claim 1, wherein the deck modification module is configured to change the response of the body of the watercraft to a flow of water over the deck of the watercraft.

3. The personal watercraft of claim 2, wherein the deck modification module includes a first surface configured to at least partially rest against the deck of the personal watercraft and a second surface configured to interact with a flow of water over the deck.

4. The personal watercraft of claim 3, wherein the second surface includes tapered sides adjacent to where the second surface meets the deck.

5. The personal watercraft of claim 3, wherein the second surface includes rounded corners where the tapered sides meet a central portion of the second surface.

6. The personal watercraft of claim 3, wherein the deck includes a cockpit and an end, and wherein the second surface includes a upturned portion configured to catch a flow of water over the end of the deck when the flow of water flows in a direction from the end toward the cockpit.

7. The personal watercraft of claim 1, wherein the deck modification module is buoyant in water.

8. The personal watercraft of claim 7, wherein the deck modification module includes a rigid outer portion enclosing a buoyant material.

9. The personal watercraft of claim 8, wherein the rigid outer portion at least partially surrounds a foam core.

10. The personal watercraft of claim 9, wherein the foam core is a polyurethane foam.

11. The personal watercraft of claim 8, wherein the rigid outer portion is formed from a thermoformed plastic.

12. The personal watercraft of claim 11, wherein the thermoformed plastic is selected from the group consisting of polyethylene, ABS plastic, and polymer/fiber composite materials.

13. The personal watercraft of claim 8, wherein the plastic outer portion completely encloses the buoyant material.

14. The personal watercraft of claim 13, wherein the buoyant material is a gas.

15. The personal watercraft of claim 8, wherein the plastic outer portion is formed from a rotationally molded plastic.

16. A self-propelled personal watercraft, comprising:
a body including a hull and a deck substantially covering the hull; and
a buoyant deck modification module removably coupled to the deck in a location substantially wholly over the deck, wherein the deck modification module is removable to decrease a volume of water displaced by the deck when the deck is submerged in water.

17. The personal watercraft of claim 16, wherein the deck includes a bow portion, and wherein the deck modification module is removably coupled to the bow portion of the deck.

18. The personal watercraft of claim 16, wherein the deck includes a stern portion, and wherein the deck modification module is removably coupled to the stern portion of the deck.

19. The personal watercraft of claim 16, wherein the deck modification module includes an impermeable outer portion enclosing a buoyant material.

20. The personal watercraft of claim 19, wherein the outer portion at least partially surrounds a closed cell foam core.

21. The personal watercraft of claim 19, wherein the outer portion is formed from a thermoformed plastic.

22. The personal watercraft of claim 21, wherein the thermoformed plastic is selected from the group consisting of polyethylene, ABS plastic, and polymer/fiber composite materials.

23. The personal watercraft of claim 19, wherein the plastic outer portion completely encloses the buoyant material.

24. The personal watercraft of claim 23, wherein the buoyant material is a gas.

25. The personal watercraft of claim 19, wherein the plastic outer portion is formed from a rotationally molded plastic.

26. The personal watercraft of claim 16, wherein the deck modification module includes a first surface configured to at least partially rest against the deck of the personal watercraft and a second surface configured to interact with a flow of water over the deck.

27. The personal watercraft of claim 26, wherein the second surface includes tapered sides adjacent to where the second surface meets the deck.

28. The personal watercraft of claim 26, wherein the second surface includes rounded corners where the tapered sides meet a central portion of the second surface.

29. The personal watercraft of claim 26, wherein the deck includes a cockpit and an end, and wherein the second surface includes a upturned portion configured to catch a flow of water over the end of the deck when the flow of water flows over the deck in a direction from the end of the deck toward the cockpit.

30. The personal watercraft of claim 16, wherein the deck modification module includes a channel configured to accept insertion of a fastener to couple the deck modification module to the deck.

31. A buoyant module for attaching to a deck of a decked self-propelled personal watercraft, the personal watercraft including a cockpit formed in the deck, the personal watercraft also including a bow and a stern, the buoyant module comprising:

a body shaped to fit between the cockpit and one of the bow and stern of the personal watercraft and to be positioned substantially wholly over the deck, wherein the body includes a first surface configured to rest at least partially against the deck of the personal watercraft, wherein the first surface is contoured to match a shape of the deck;

a second surface configured to interact with a flow of water across the deck of the personal watercraft; and a buoyant material disposed between the first surface and second surface.

32. The buoyant module of claim 31, wherein the first surface is formed from a foam material and the second surface is formed from a rigid, water-impermeable material.

33. The buoyant module of claim 32, wherein the buoyant material is a closed-cell foam.

34. The buoyant module of claim 32, wherein the rigid, water-impermeable material is a plastic material.

35. The buoyant module of claim 34, wherein the plastic material is a thermoformed plastic material.

36. The buoyant module of claim 31, wherein the first and second surfaces are formed from the same material.

37. The buoyant module of claim 36, wherein the buoyant module is formed from rotationally molded plastic.

38. The buoyant module of claim 36, wherein the buoyant material is air.

39. The buoyant module of claim 31, further comprising a channel formed through the buoyant module, the channel being configured to accommodate insertion of a fastener to couple the buoyant module to the watercraft.

* * * * *